United States Patent [19]

Wood

[11] Patent Number: 5,292,858

[45] Date of Patent: Mar. 8, 1994

[54] METHOD OF PRODUCTION OF COPOLYMERS OF POLYAMINO ACIDS

[75] Inventor: Louis L. Wood, Elkridge, Md.

[73] Assignee: SRCHEM Incorporated, Elkridge, Md.

[21] Appl. No.: 31,856

[22] Filed: Mar. 16, 1993

[51] Int. Cl.$^5$ .............................................. C08G 69/28
[52] U.S. Cl. .................................. 528/345; 528/332; 528/335; 528/342; 528/363
[58] Field of Search ............... 528/345, 363, 332, 342, 528/335

[56] References Cited

U.S. PATENT DOCUMENTS 3,351,520  3/1967  Spicer et al. .................. 162/164
3,846,380  2/1974  Fujimoto et al. ............... 260/78 A

OTHER PUBLICATIONS

Ser. No. 07/968, Copolymers of Polyamino Acids as Tartar Barrier Agents, Louis L. Wood, Gary J. Calton, filed Oct. 29, 1992.

Ser. No. 07/968,319, Copolymers of Polyamino Acids as Scale Inhibition Agents, Louis L. Wood, Gary J. Calton, Filed Oct. 29, 1993.

*Primary Examiner*—Harold D. Anderson
*Attorney, Agent, or Firm*—William S. Ramsey

[57] ABSTRACT

Copolymers of polyamino acids formed by reaction of an alcohol with maleic anhydride to form the half ester followed by addition of ammonia, ammonia and an amine, or ammonia and a polyamine. The mixture is then heated to 120°–350° C. to form polysuccinimide or a derivative thereof. The resulting polysuccinimide may be hydrolyzed to form a derivative of polyaspartic acid or its salt.

8 Claims, No Drawings

METHOD OF PRODUCTION OF COPOLYMERS OF POLYAMINO ACIDS

FIELD OF THE INVENTION

This invention relates to a method of synthesis of copolymers of polyamino acids and their salts.

DESCRIPTION OF RELATED ART

U.S. Pat. No. 3,846,380 discloses the preparation and composition of copolymers of polyamino acids by the reaction of polysuccinimide with primary or secondary aliphatic amines, followed by alkaline hydrolysis to provide surface active agents. The polysuccinimide is formed by high temperature reaction in tetralin and further reacted with amines in the solvent dimethylformamide. Emphasis is placed on long chain alkylamines having eight to twenty carbon atoms. The products formed are said to have good solubilizing ability, emulsifying and dispersing properties, as well as good foaming properties. They are useful as foaming agents, solubilizing agents, dispersing agents, emulsifying agents, rust-proofing agents, fiber-treating agents, level dyeing agents and retarding agents.

U.S. Pat. No. 3,351,520 discloses the preparation wet strength agents from maleic acid esters with amines followed by reaction with epichlorohydrin. Excess alcohol can function as a solvent for the reaction with the amine.

SUMMARY OF THE INVENTION

We have discovered that polypeptide materials that have a general formula of

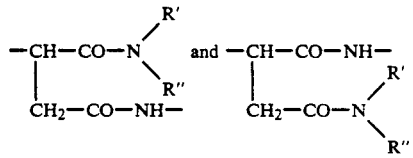

wherein R' is a hydrogen or an alkyl, an alkenyl or an amide group having 1 to 36 carbons and R" is a hydrogen, an alkyl, an alkenyl or an amide group having 1 to 36 carbons, together with at least one of the groups

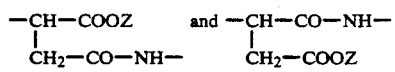

wherein Z represents a hydrogen atom, an ammonia molecule, an alkali metal or an alkaline earth metal, as a repeating unit, can be prepared by reacting maleic anhydride with an alcohol containing 1 to 36 carbons, preferably 1 to 20 carbons, and more preferably 1 to 5 carbons, to form the half ester followed by the addition of an equivalent of ammonia, or ammonia and an amine or a polyamine, containing one to 36 carbons, preferably 8-20 carbons, and heating to 120°-350° C., preferably 140°-225° C. and more preferably 150°-180° C., until one equivalent of alcohol is distilled away and hydrolyzing the copolymer of polysuccinimide formed with a hydroxide.

Illustrative of the the suitable alcohols one can mention are methyl alcohol, ethyl alcohol, n-propyl alcohol, isopropyl alcohol, n-butyl alcohol, sec-butyl alcohol, n-hexyl alcohol, n-heptyl alcohol, n-octyl alcohol, lauryl alcohol, nonyl alcohol, oleyl alcohol, stearyl alcohol, allyl alcohol, crotyl alcohol, cyclopentanol, cyclohexanol, ethylene glycol, propylene glycol, trimethylene glycol, tetramethylene glycol, pentamethylene glycol, hexamethylene glycol, glycerol, trimethylol propane, pentaerythritol, arabitol, sorbitol, mannitol and the like.

The object of this invention is to provide a method for production of polymers and copolymers of amino acids.

DEFINITIONS

Polysuccinimide is the imide form of polyaspartic acid and is also known as anhydropolyaspartic acid.

The counterion, "Z" above includes hydrogen, ammonium ion, the alkali and alkaline earth metals examples of which as their cations are, $H^+$, $Na^+$, $K^+$, $Mg^+$, $Li^+$, and $Ca^{++}$, $Zn^{++}$, $Ba^{++}$, $Co^{++}$, $Fe^{++}$, $Fe^{+++}$, and $NH_4^+$.

DETAILED DESCRIPTION OF THE EMBODIMENTS

Methods of preparation of polyamino acid derivatives based upon reaction of primary or secondary amines with polysuccinimide are known as disclosed in U.S. Pat. No. 3,846,380, incorporated herein by reference. The polysuccinimide is formed by high temperature reaction in tetralin and further reacted with amines in the solvent dimethylformamide. These materials were observed to have useful properties as surface active agents having no cloud point and good solubilizing, emulsifying and dispersing abilities. Thus, their use as foaming agents, solubilizing agents, dispersing agents, emulsifying agents, rust-proofing agents, fiber treating agents, level dyeing agents and retarding agents was disclosed.

The use of these agents as inhibitors of tartar deposition has been disclosed in U.S. Pat. appl. Ser. No. 07/968,506 Filed Oct. 29, 1992, U.S. Pat. No. 5,266,305 Wood, et al., Copolymers of Polyamino Acids as Tartar Barrier Agents and is incorporated herein by reference. Polyamino acid derivatives are excellent inhibitors of the formation of hydroxylapatite in vitro, which has previously been shown to correlate closely with in vivo inhibition of tartar deposition.

The use of these polyamino acid derivatives as inhibitors of scale deposition has been disclosed in U.S. Pat. appl. Ser. No. 07/968,319 Filed Oct. 29, 1992, pending Wood, et al., Copolymers of Polyamino Acids as Scale Inhibition Agents, and is incorporated herein by reference. Polyamino acid derivatives are excellent inhibitors of the formation of scale deposition. In particular, the types of scale in which deposition is inhibited are those exemplified by hard water, boiler water, cooling water, oil well waters, agricultural sprays and irrigation water. These scales typically consist of the salts of the bivalent metal ions.

That polyamino acid derivatives that have a general formula of

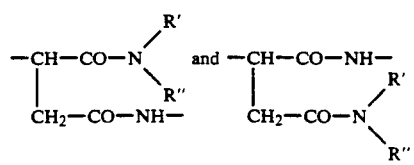

wherein R' is a hydrogen or an alkyl, an alkenyl or an amide group having 1 to 36 carbons and R" is a hydrogen, an alkyl, an alkenyl or an amide group having 1 to 36 carbons, together with at least one of the groups

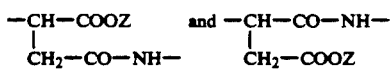

wherein Z is defined above, as a repeating unit. The polyamino acid derivatives are prepared by reacting maleic anhydride with an alcohol containing 1 to 36 carbons, preferably 1 to 20 carbons, and more preferably 1 to 5 carbons, to form the half ester followed by the addition of an equivalent of ammonia, or ammonia and an amine or a polyamine, containing one to 36 carbons, preferably 8-20 carbons, and heating to 120°-300° C., preferably 140°-225° C. and preferably 150°-180° C., until one equivalent of alcohol is distilled away. The resulting polymer or copolymer of polysuccinimide may be hydrolyzed with an alkaline earth or alkali metal hydroxide or ammonium hydroxide, forming the polyamino acid derivatives. Alkaline earth and alkali metal hydroxides include magnesium, calcium, strontium, barium, lithium sodium, and potassium hydroxides. They may be used in their solid form or as their aqueous or organic solutions.

Preferred groups for R' and R" are hydrogen, methyl, oleyl, stearyl, and lauryl.

EXAMPLE 1

Polymerization of Monomethylmonoammonium Maleate with Oleyl Amine

To 40 g of methanol was added 39.2 g (0.4 moles) of maleic anhydride. The resultant solution was stirred at 40° to 50° C. for 2 hrs and then allowed to stand at 25° C. for 12 hrs. To the resultant solution of monomethylmaleate in methanol was added 10.8 g (0.04 moles) of oleyl amine. This solution was stirred at 40° to 50° C. for 3 hrs and allowed to stand at 25° C. for 12 hrs. To this solution was then added 6.0 g (0.35 moles) of gaseous ammonia. The resultant solution was then boiled at 60° to 100° C. for one hour to remove the solvent alcohol. The residual oil was raised to 150° C. and then slowly raised to 230° C. over a four hour period. The resultant 49.5 g of brown gummy solid was heated to 240°-245° C. for an additional 20 minutes yielding 48.1 g of brown solids.

These solids were slurried in 80 g of water and treated with 16 g of NaOH in 24 g of water to give a dark red-brown solution. This solution was stirred at 50° C. while a total of 6 g of 30% $H_2O_2$ was added over a period of three hours to decolorize the product. Continued stirring at 25° C. for 12 hours gave a clear orange solution estimated to contain 40% solids consisting of a copolymer of oleyl $\alpha,\beta$-polyaspartate amide and $\alpha,\beta$-polyaspartic acid as an aqueous solution of its sodium salt.

EXAMPLE 2

Polymerization of Monomethylmonoammonium Maleate

To 20 g of methanol was added 19.6 g (0.2 moles) of maleic anhydride. The resultant solution was stirred at 40° to 50° C. for 1.5 hrs while allowing it to cool to room temperature. To this solution was added 3.7 g (0.22 moles) of gaseous ammonia. The resultant solution evaporated to a melt at 110° C. The melt was heated at 145°-150° C. for 15 minutes and then heated at 150°-180° C. for thirty minutes to give 20.0 g of red solids.

A 10 g portion of these solids were slurried in 20 g of water and treated with 4 g of NaOH in 6 g of water to give a clear red solution. this solution was stirred at 50° C. while a total of 1.5 g of 30% $H_2O_2$ was added over a period of two hours to decolorize the product, resulting in a clear yellow solution estimated to contain 40% solids consisting of a polymer of $\alpha,\beta$-polyaspartic acid as an aqueous solution of its sodium salt.

EXAMPLE 3

Polymerization of Monoisopropylmonoammonium Maleate with Oleyl Amine

To 75 g of isopropanol was added 39.2 g (0.4 moles) of maleic anhydride. The resultant solution was stirred at 25° to 70° C. for 3 hrs while cooling to 25° C. To this solution was added 5.2 g (0.02 moles) of oleyl amine. The solution was stirred for 30 min at 25° C. and 6.5 g (0.38 moles) of gaseous ammonia was added. The resultant solution was placed in a pear shaped flask on a rotary evaporator and the solution was heated at 150°-185° C. for 30 minutes and then heated at 200°-220° C. for fifteen minutes to give a red-brown solid. The solid was cooled to 25° C. and pulverized. The solids were then heated with rotation at 235°-245° C. for ten min. After pulverizing, further heating of these solids at 240°-250° C. for 15 min gave 44.1 g red-brown solid.

These solids were slurried in 60 g of water and treated with 16 g of NaOH in 24 g of water to give a clear red-brown solution. A total of 5.5 g of 30% $H_2O_2$ was added to decolorize the product, giving a clear orange solution after 24 hrs, containing 38% solids consisting of a copolymer of oleyl-$\alpha,\beta$-polyaspartic acid as an aqueous solution of its sodium salt. When shaken, the solution gave a stable foam.

Precipitation Assay for Calcium Sulfate

The material to be tested as an inhibitor of scale formation was added in appropriate quantities to a solution of 10 ml of calcium chloride solutions (21.6 g/L of $CaCl_2$ dihydrate and 41.4 g/L of NaCl) and 10 ml of sulfate solution (20.9 g/L of $Na_2SO_4$ and 41.4 g NaCl). The mixture was then placed in an oven at 160° F. for 12 hours. Finally the mixture was filtered through Whatman #2 paper and dried at 160° F. for 8 hours, after which the weight of precipitate was determined.

In the $CaSO_4$ precipitation assay, the blank gave 82 mg of precipitate, while at 2.5 ppm of the above copolymer, 67 mg was obtained and at 5.0 ppm, 36 mg was obtained.

EXAMPLE 4

Polymerization of Monobutylmonoammonium Maleate with Oleyl Amine

In an identical fashion to that of Example 3, 92.5 g of n-butanol was added 39.2 g (0.4 moles) of maleic anhydride and treated as in Example 3 resulting in 48.1 g red-brown solid.

These solids were treated as in Example 3 to give a light orange solution containing 39% solids consisting of a copolymer of oleyl-$\alpha,\beta$-polyaspartic acid as an aqueous solution of its sodium salt. When shaken, the solution gave a stable foam. In the $CaSO_4$ precipitation assay, given in Example 3, the blank gave 82 mg of precipitate, while at 2.5 ppm of the above copolymer, 78 mg was obtained and at 5.0 ppm, 50 mg was obtained.

EXAMPLE 5

Polymerization of Monocyclohexylmonoammonium Maleate with Oleyl Amine

In an identical fashion to that of Example 3, 125 g of cyclohexanol was added 39.2 g (0.4 moles) of maleic anhydride and treated as in Example 3 resulting in 63 g red-brown solid. The solid was washed with two 25 ml portions of isopropanol to remove 1.8 g of brown gum.

These solids were then hydrolyzed as in Example 3 to give a dark red-brown aqueous solution and 15 g of a colorless phase consisting of cyclohexanol. When shaken, the aqueous solution gave a stable foam. In the CaSO$_4$ precipitation assay of Example 3, the blank gave 82 mg of precipitate, while at 2.5 ppm of the above copolymer, 85 mg was obtained and at 5.0 ppm, 54 mg was obtained.

EXAMPLE 6

Copolymer of Oleylamide-Diethylenetriamine and Monomethylmonoammonium Maleate Diethylene triamine (4,0 g, 0.039 moles) was added to tall oil fatty acids (over 95% oleic acid) (2.25 g) and heated for 10 min with stirring at 190°–200° C. and the mixture was dissolved in 40 g of methanol. Maleic anhydride (39.2 g, 0.4 moles) was added to this mixture and the reaction exothermed to 60° C. The reaction mix was cooled to 25° C. and ammonia (6.8 g) was added over a period of 20 min. The solution was heated with stirring at 175°–195° C. for 20 min resulting in an orange syrup. The reaction was then heated for 8 min at 195°–225° C. and the resulting foam was broken up. The mixture was then headed for 10 min at 225°–245° C., broken up and heated for 10 min at 235°–245° C. resulting in 41.3 go of a tan powder.

The powder was mixed with 60 g of water and NaOH (15 g in 24 g water) was slowly added. Addition of 120 ml of water gave a fluid solution which was very sudsy. In the CaSO$_4$ precipitation assay of Example 3, the blank gave 81 mg of precipitate, while at 2.5 ppm of the above copolymer, 51 mg was obtained and at 5.0 ppm, 3 mg was obtained.

Drift Assay for CaCO$_3$

The sodium polyaspartate was tested for inhibition of calcium carbonate precipitation by the calcium drift assay. In this assay a supersaturated solution of calcium carbonate is formed by adding 29.1 ml of 0.55 M NaCl and 0.01M KCl to 0.3 ml of 1.0M CaCl$_2$. The compound to be tested is then added at 1.7 ppm (final concentration). The reaction is initiated by the addition of 0.6 ml of 0.5M NaHCO$_3$ and immediately adjusting the pH to 7.5–8.0 by titration with 1N NaOH. At three minutes, 10 mg of CaCO$_3$ is added and the pH is recorded. The decrease in pH is directly correlated to the amount of CaCO$_3$ that precipitates. The effectiveness of the inhibition is compared to that of sodium polyacrylate, used commercially for the purpose of preventing scale formation. The blank had a change in pH of 0.90 and 1.00 at 10 and 20 min respectively, whereas the above copolymer had a change of 0.56 and 0.58 respectively. The 2500 mol wt sodium polyacrylate had a change of 0.34 at both times.

It will be apparent to those skilled in the art that the examples and embodiments described herein are by way of illustration and not of limitation, and that other examples may be utilized without departing from the spirit and scope of the present invention, as set forth in the appended claims.

I claim:

1. A method of synthesis of a polyamide that has a repeating unit of the general formula of

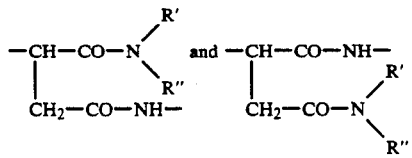

wherein R' is a hydrogen or an alkyl group having 1 to 36 carbons and R" is a hydrogen or an alkyl group having 1 to 36 carbons, together with at least one of the groups

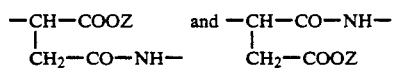

wherein Z represents a hydrogen atom, an alkali metal or an alkaline earth metal, as a repeating unit, the method comprising reacting maleic anhydride with an alcohol containing 1 to 36 carbons, to form the half ester followed by the addition of an equivalent of ammonia, or ammonia and an amine, containing one to 36 carbons, and heating to 120°–350° C., until one equivalent of alcohol is distilled away and hydrolyzing the copolymer of polysuccinimide formed with an alkaline earth or alkali metal hydroxide or ammonium hydroxide.

2. The method of claim 1 in which the alcohol contains 1 to 20 carbons.

3. The method of claim 1 in which the alcohol contains 1 to 10 carbons.

4. The method of claim 1 in which the alcohol is methanol, ethanol, n-propanol, isopropanol, or n-butanol.

5. The method of claim 1 in which the amine contains 8-20 carbons.

6. The method of claim 1 in which the temperature is 140°–285° C.

7. The method of claim 1 in which the temperature is 150°–245° C.

8. The method of claim 1 in which the hydroxide is sodium, potassium or ammonium hydroxide.

* * * * *